(12) United States Patent
Scott et al.

(10) Patent No.: US 7,156,050 B2
(45) Date of Patent: Jan. 2, 2007

(54) MANUALLY FOLDED BIRDHOUSE

(75) Inventors: Brandon Louis Scott, Union, KY (US); James Robert Rich, Union, KY (US)

(73) Assignee: Green Mansion LLC, Union, KY (US)

( * ) Notice: Subject to any disclaimer, the term of this patent is extended or adjusted under 35 U.S.C. 154(b) by 0 days.

(21) Appl. No.: 10/740,916

(22) Filed: Dec. 22, 2003

(65) Prior Publication Data

US 2005/0132972 A1   Jun. 23, 2005

(51) Int. Cl.
*A01K 31/08* (2006.01)
*A01K 31/00* (2006.01)

(52) U.S. Cl. ...................... 119/431; 119/433

(58) Field of Classification Search ............... 119/431, 119/432, 428, 429, 433, 434, 435; 220/6, 220/7
See application file for complete search history.

(56) References Cited

U.S. PATENT DOCUMENTS

| | | | |
|---|---|---|---|
| 1,911,702 A | 5/1933 | Mallgraf | |
| 2,190,721 A | 2/1940 | Mallgraf | |
| 2,230,305 A | 2/1941 | Mallgraf | |
| 2,292,614 A | 8/1942 | Copeman | |
| 2,424,733 A | 7/1947 | Benson | |
| 2,666,414 A | 1/1954 | Burr et al. | |
| 3,195,507 A * | 7/1965 | Miller | 119/431 |
| 3,250,249 A | 5/1966 | Nelson et al. | |
| 3,478,722 A | 11/1969 | Falcone et al. | |
| 5,195,644 A * | 3/1993 | Schmid | 220/6 |
| 5,862,931 A * | 1/1999 | Cox et al. | 220/6 |
| 6,311,643 B1 | 11/2001 | Christian et al. | |
| 6,386,383 B1 * | 5/2002 | Roudonis | 220/7 |
| 6,397,781 B1 | 6/2002 | Bellington | |

* cited by examiner

*Primary Examiner*—Teri Pham Luu
*Assistant Examiner*—Elizabeth Shaw
(74) *Attorney, Agent, or Firm*—Smith, Gambrell & Russell, LLP (57) ABSTRACT

Precut, production blank components can be folded manually to form a birdhouse without the need for tools or other aids in assembly, even where the blank components are manufactured from metal, rigid plastic or the like. The precut blank components include a one-piece main panel and a detached panel. The one-piece panel includes a rear section, a base section, first and second side sections, and a top section. Each section includes precut slots, tabs and hinges that act as folding guides, allowing the blank to easily fold into a structure defining an enclosure like the birdhouse. The detached panel then is mounted to the so constructed main panel to cover the enclosure and thereby complete the birdhouse.

15 Claims, 10 Drawing Sheets

MANUALLY FOLDED BIRDHOUSE

BACKGROUND OF THE INVENTION

1. Field of the Invention

The present invention generally relates to an easily constructible birdhouse and a method of making a birdhouse. Further, the present invention relates to a precut blank designed to be manually folded into a birdhouse.

2. Description of the Prior Art

The prior art includes various approaches to prefabricated birdhouses.

For instance, U.S. Pat. No. 1,911,702, U.S. Pat. No. 2,190,721 and U.S. Pat. No. 2,230,305 describe collapsible paperboard birdhouses made from single blanks of any non-metallic material. The houses are formed by being folded along creases of the blank and secured using interlocking tabs.

U.S. Pat. No. 2,292,614 describes a tubular collapsible paperboard birdhouse made from a one-piece blank that is secured using interlocking tabs and slots.

U.S. Pat. No. 2,424,733 describes a birdhouse formed of an integral blank of fibrous material made from folding its hingedly connected walls. It is secured by anchoring flaps.

U.S. Pat. No. 2,666,414 describes a collapsible birdhouse that is formed from a single piece of paperboard by bending its hingedly connected wall panels along score lines. It is secured by interlocking tabs and slots.

U.S. Pat. No. 3,250,249 describes a birdhouse formed from a one-piece blank that is die-cut from corrugated cardboard. The blank is folded along creased fold lines to connect hingedly connected wall panels. It also is secured using interconnecting tabs and slots.

U.S. Pat. No. 3,478,722 describes a birdhouse where each compartment of an apartment structure is erected from a one-piece blank. The blank is folded and secured using interconnecting tabs and slots.

U.S. Pat. No. 6,311,643 describes a birdcage made from paper or plastic that is folded to provide a plurality of cage surfaces and is capable of assembly with a metal grate to form a complete enclosure. The enclosure is designed to have orthogonal joints between the wall panels. It is sealed by interconnecting flaps and tabs.

U.S. Pat. No. 6,397,781 describes a birdhouse capable of easy assembly by means of an integral locking structure.

While prefabricated birdhouses are currently available that can be assembled without the use of any additional tools or fasteners, none offer the ease of assembly, the ease of modification, or the structural durability provided by the present invention.

SUMMARY OF THE INVENTION

The present invention involves a precut blank and one other panel detached from the blank that are manually, folded to construct the birdhouse. The invention also pertains to a method of making a manually folded birdhouse, and a kit that is assembled according to such method. The simplified design allows folding by hand into a birdhouse, with minimal effort and without the need for additional tools, adhesives, fasteners or parts. Manually folding is encouraged even though the components of the birdhouse preferably are made from metal. However, the precut components can be made from other durable, rigid material that is easily folded by hand, for example plastic or cardboard in sheet or coil form.

The precut components include a one-piece main blank panel and at least one detached panel. The one-piece main panel includes a plurality of sections that form an enclosure when folded or "squared up". The plurality of sections includes a front section, a top section, a rear section, a base section, and at least one side section. The detached panel is attached to the foldably constructed main panel to cover and complete the main panel enclosure structure to finish the birdhouse. Afterwards, this detached panel is easily removable for viewing and cleaning. The one-piece blank panel is equipped with precut seams, slots, hinges and tabs that act as guides to ensure proper folding. The seams are cut into the main panel creating a plurality of wall sections. The seams are created by a so-called lost material method where up to 85% of the blank material is cut away and removed, leaving a hinge in at least the center of the respective seam. Such flexible hinges preferably are located in a center portion as well as at end portions of the seams. The precut flexible hinges create the joints at which the sections are connected and where they are folded. The precut tabs preferably are located along the outer edges of the main panel, and are designed to be inserted into and then bent over the precut slots which are located near the periphery of the sides of the main panel. Bending of the inserted tabs about the respective slots secures the birdhouse enclosure structure. The birdhouse, according to the invention, once constructed also can be disassembled manually for easy access, cleaning and transport.

The precut blank components can be fabricated by any of the well known methods of punching, fine blanking, stamping, laser cutting, water jet, plasma cutting, wire EDM, or injection molding. This allows for inexpensive manufacturing. The flat design of the blank components provides for easy shipping, and storage at reduced cost.

The blank components preferably have a plurality of precut openings that when "squared up" will provide drainage, ventilation and entrance/exit points for the constructed birdhouse. The blank components can be modified easily to permit insertion of additional separate interior panels (of metal) to create an air space for added ventilation. The blank components also can be insulated. A perforation in the bottom of the completed birdhouse allows parasites and dirt to fall from the house. Preferably, the blank components are designed with blunt edges to avoid injury to people or birds. When metal is used as the blank material, the resulting birdhouse provides superior durability; it is virtually indestructible with the potential to last indefinitely. Further, when the blank components are made of reflective metals such as aluminum, the resulting birdhouse features cooler interior temperatures in direct sunlight. It features lower interior temperatures than many wooden houses that are currently available.

The blank components also are easily modified with the removal of any panel section (top, side, front, or base). In addition, the size of the blank components, and thus the resulting birdhouse itself are adaptable, so that the house components can be manufactured to accommodate a wide variety of nesting birds from wrens, to owls, to wood ducks. The birdhouses created by the blank components of the present invention have the added benefit of being fully enclosed without a perch. This provides added safety to birds from unwanted animals. The present invention further provides a birdhouse with universal hanging slots and openings that allow it to be easily moved or mounted on trees, posts, or buildings.

It is to be understood that both the foregoing general description and the following detailed description are exemplary and explanatory only, and are intended to provide further explanation of the invention as claimed. The accompanying drawings are included to provide a further understanding of the invention. The drawings are incorporated in and constitute part of this specification to illustrate several embodiments of the invention and together with the description, serve to explain the principles of the invention.

DETAILED DESCRIPTION OF THE PREFERRED EMBODIMENTS

Figure 1:
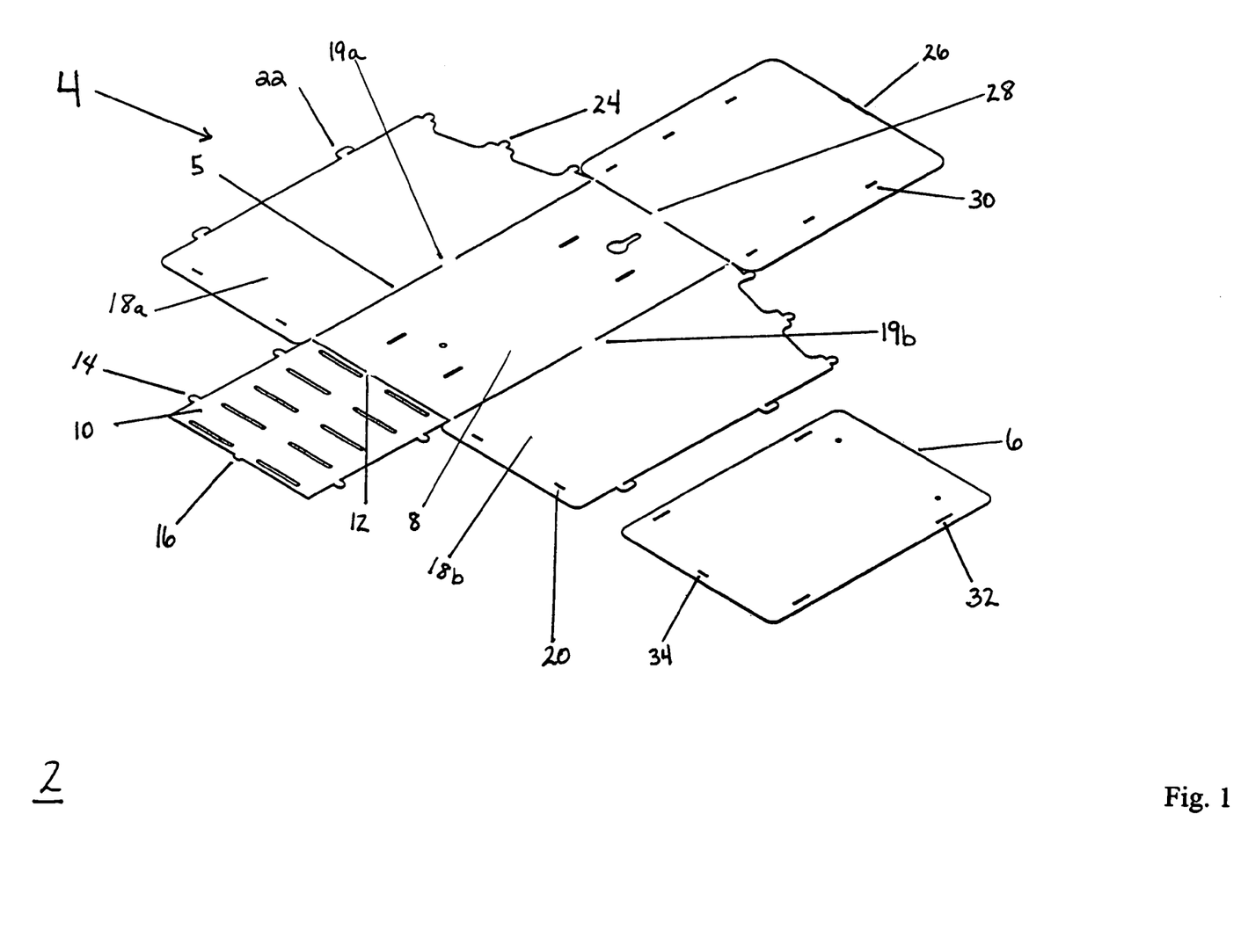
FIG. 1 is a perspective view of the entire blank components of a first embodiment of the birdhouse of the present invention.

FIG. 1 is a view of a preferred embodiment of the precut blank components 2 according to the invention. The precut blank components 2 preferably are made from metal, however, they can be made from any durable, rigid material that is easily folded by hand, including metal, plastic or cardboard in sheet or coil form. This embodiment of the invention includes a multi-sectional, one-piece main panel 4 and a single section detached front panel 6. The one-piece main panel 4 has precut seams 5 that define a rear section 8, a base section 10, and at least one side section 18. The precut seams 5 are created by a so-called lost material method where thin elongated portions of the blank material are cut away (removed). Small sections of the blank material are retained in this lost material method to embody hinges at each seam to connect the respective sections and allow adjacent sections to fold relative to each other. The hinges created by the lost material cutting method are preferred, however it will also be apparent that actual hinge joints could be installed, or that still other alternatives could be used, albeit at a likely higher manufacturing cost.

The base section 10 includes a base hinge 12 that renders the base section 10 manually foldable relative to the rear section 8. Base section 10 also has a plurality of opposing u-shaped side tabs 14 formed on opposing side edges thereof and at least one upper tab 16 formed on an upper edge thereof. Preferably main panel 4 of this embodiment also includes first and second side sections 18a, 18b that have first and second respective hinges 19a, 19b so as also to render the first and second side sections 18a, 18b foldable by hand relative to the rear section 8. Preferred connective means in the way of a plurality of opposing lower slots 20 are formed on the lower edges of side sections 18 where they are disposed for receiving the side tabs 14 of the side edges of base section 10, so as to secure the side sections 18a, 18b to the base section. Further preferred connective means in the way of a plurality of opposing side tabs 22 are formed on side edges of said side sections 18, and a plurality of upper tabs 24 are formed on upper edges of the side sections. This embodiment also includes a top section 26 with a top section hinge 28 so as to render the top section manually foldable relative to the rear section 8. A plurality of top section side slots 30 formed on opposing side edges of the top section 26 are disposed for receiving the side section upper tabs 24 of the side sections 18 to thereby connect and secure the side sections 18 to the top section 26.

Reference now is made to single-section panel 6. Detached front panel 6 also has connective devices in the way of a plurality of side slots 32 formed on opposing sides thereof. Slots 32 are so disposed to receive L-shaped side section locking tabs 22 provided on side sections 18 of the main panel 4. Also, a connective slot 34 is formed on the lower edge of the detached panel 6. This slot 34 receives the upper tab 16 of the base section 10 of the main panel 4.

Figures 2A, 2B, 2C, 2D, 2E, 2F, 2G:
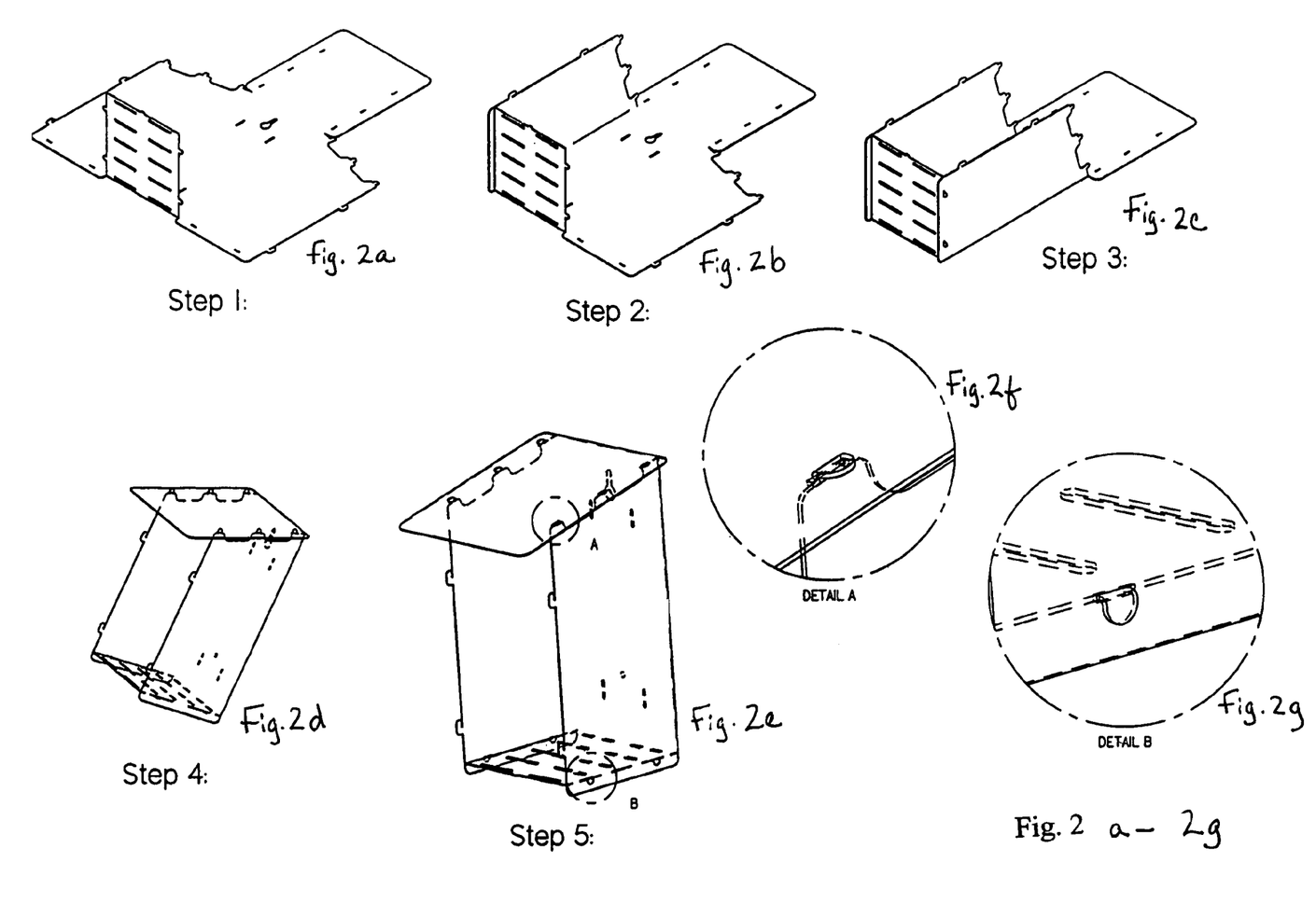
FIGS. 2(a)–2(g) are perspective views illustrating a folding and securing process according to the invention to assemble the main enclosure structure of the first embodiment of the birdhouse.

FIGS. 2(a)–2(g) depict the folding and securing process to assemble the body of the birdhouse in accordance with the invention. The initial steps in the assembly process for this embodiment require folding the main panel 4 along the base hinge 12 (FIG. 2(a)), each of the side hinges 19a, 19b (FIGS. 2(b) and 2(c)), and then along the top hinge 28 (FIG. 2(d)). These folding steps result in the enclosure (without a front) shown in FIGS. 2(d) and 2(e). As the main panel 4 is folded at side hinges 19a, 19b, the base section side tabs 14 project into the lower slots 20 of the side sections 18 to connect and fasten the base section 10 to the side sections 18. As seen in FIGS. 2(d)–2(e), in a similar fashion, the upper tabs 24 of the side sections 18 are inserted into the side slots 30 of the top section 26 so as to secure the side sections 18 to the top section 26. With respect to FIGS. 2(f)–2(g), after insertion, each of tabs 14, 24 is bent by hand over its respective slot 20, 30 to secure the enclosure provided by the so assembled main panel 4.

Figure 3A:
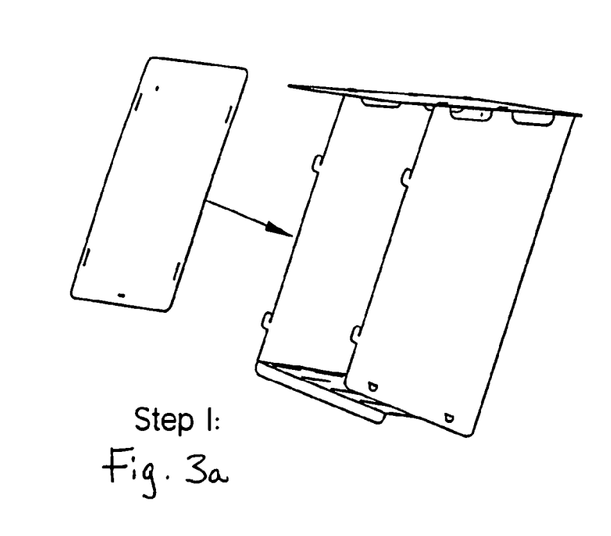
FIGS. 3(a)–3(e) are views illustrating attachment of the front panel.
Figure 3B:
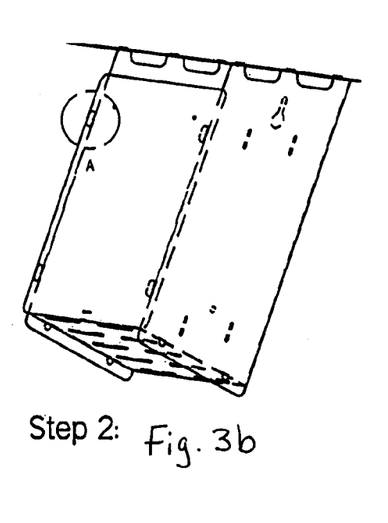
Figure 3C:
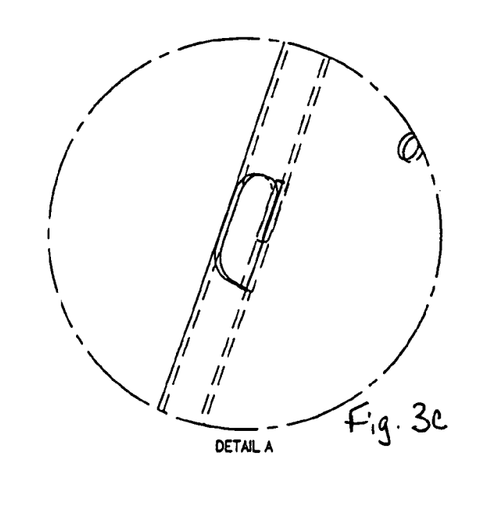
Figure 3D:
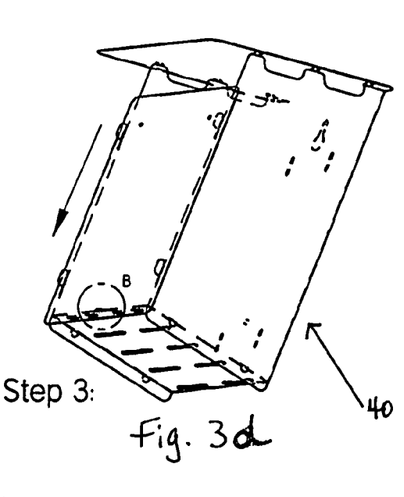
Figure 3E:
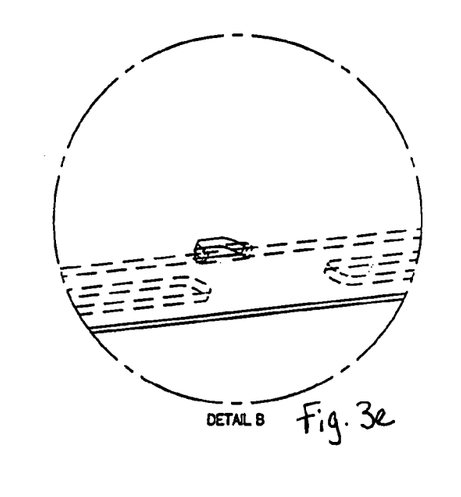

FIGS. 3(a)–3(e) demonstrate front panel attachment to complete a birdhouse enclosure. Side locking tabs 22 of the side sections 18 of the main panel 4 are inserted into the side connective slots 32 of front panel 6. As seen in FIGS. 3(b)–3(d), once locking tabs 22 are received within slots 32, the so attached front panel 6 then is made to slide in a downward direction, as illustrated in FIG. 3(d), thereby locking the L-shaped locking tabs 22 within the side slots 32. This fastens the now attached front panel 6 to the folded main panel 4 enclosure. The tab locking also allows the upper tab 16 of the base section 10 to be inserted into the lower slot 34 of the now attached front panel 6. This completes construction of the inventive birdhouse. Hence, a complete birdhouse 40 in accordance with the first embodiment of the invention is shown in FIG. 3(d). It is seen that the preferred completed birdhouse 40 as shown in FIG. 3(d) omits a perch; this is actually of benefit to birds in providing added safety by preventing access by unwanted animals.

From this disclosure, and the inventive birdhouse hereof, those of ordinary skill in the art will come to understand that alternatives to the connective devices, e.g. tabs and slots, can be employed by the invention.

Figure 4:
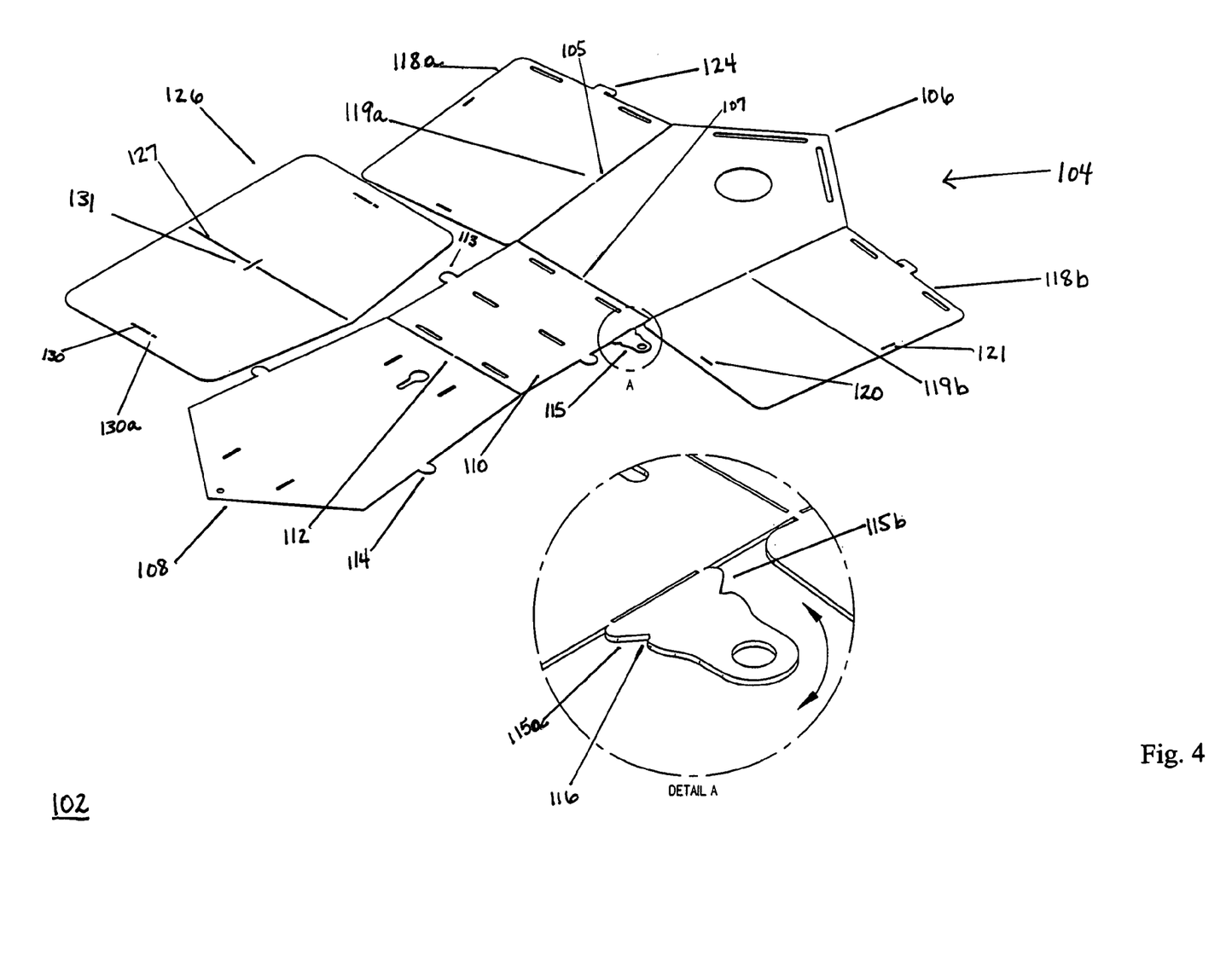
FIG. 4 is a perspective view of the blank components of a second embodiment of the birdhouse according to the invention.

FIG. 4 shows a second preferred embodiment of the production blank components 102 for a birdhouse in accordance with the invention. This embodiment likewise includes a one-piece main panel component 104 and a detached panel component 126. In this embodiment, detached panel 126 provides the top or roof of the completed birdhouse. The one-piece main panel 104 has precut seams 105 that define a rear section 108, a base section 110, and at least one side section 118. Base section 110 has at least one base section side tab 113 formed on each side edge thereof. Preferred base section 110 also has a detachable hanging member 115 on an upper portion of the side edge. As will be understood, hanging member 115 could be formed at other places on main panel 104, or even on detached panel 126. A front panel section 106 has a front panel hinge 107 so as to render the front panel section 106 foldable relative to the base section 110. Attached to the front panel 106 are first and second side sections 118a, 118b. The first and second side sections 118a, 118b include first and second respective hinges 119a, 119b that make the first and second side sections 118a, 118b manually foldable relative to the front panel section 106. Side sections 118a, 118b further include at least one L-shaped locking tab 124 on each upper edge and at least one connective lower slot 120 on each lower edge, as well as at least one connective side slot 121 on each side edge. As seen from FIG. 7(c), the L-shaped locking tab 124 also includes an extra protrusion from the upper end of the L to create a hook portion 124a. Lower slot 120 is disposed to receive base section side tab 113 while each side slot 121 is disposed to receive one of rear section side tabs 114 located on the opposing side edges of the rear section 108. The rear section 108 further includes a rear section hinge 112 so as to render the rear section 108 foldable relative to the base section 110. Detached top panel 126 includes at least one connective side slot 130 formed on each opposing side edge of the top panel 126. Next to each connective side slot 130 is a side slot extension 130a. Slots 130 are disposed to receive the L-shaped locking tabs 124 formed on the side sections 118 of the main panel 104, and side slot extensions 130a are disposed to receive the hook portion 124a of each L-shaped locking tab 124. Detached top panel component 126 also includes a central slot 131 formed in its central portion for receiving the hanging member 115, after the member 115 has been detached from base section 110.

Figure 5A:
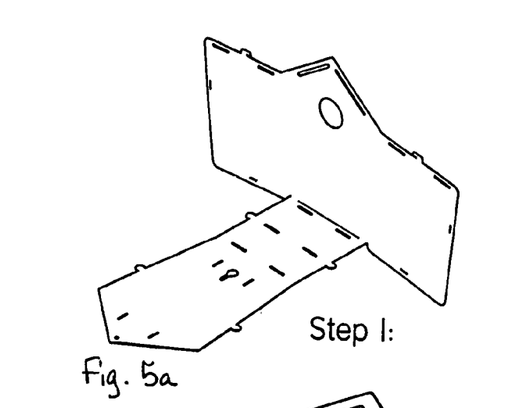
FIGS. 5(a)–5(h) are perspective views illustrating a folding and securing process according to the invention to assemble the main enclosure structure of the second embodiment.
Figures 5B, 5C, 5D, 5E, 5F, 5H:
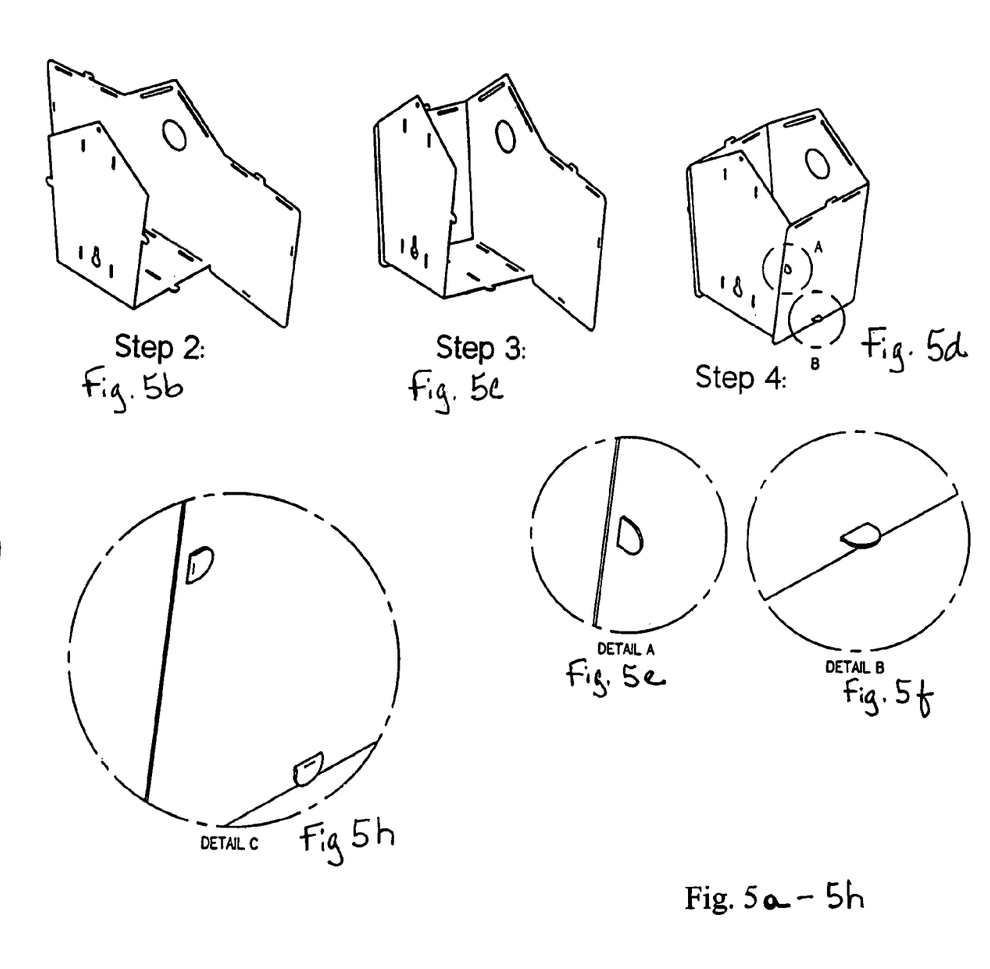
Figure 5G:
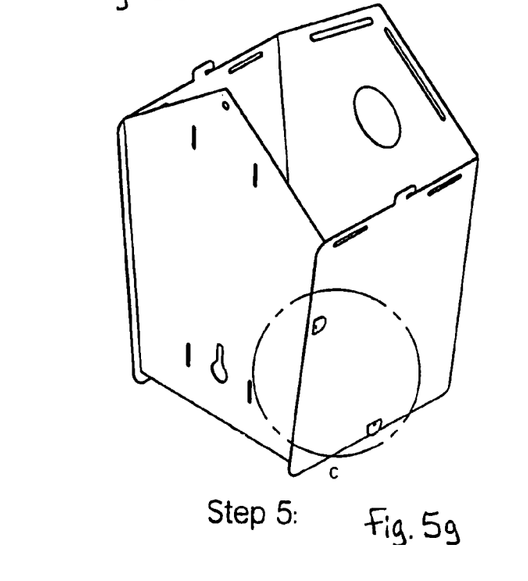

FIGS. 5(a)–5(h) demonstrate the folding process to assemble the second embodiment of the body of the inventive birdhouse. The folding process for this embodiment of the invention requires manually detaching the detachable hanging member 115 from the base section 110. Where panel components 104, 126 are made of metal or plastic, detaching of hanging member 115 may be made without tools simply by repeatedly bending member 115 along its attaching score line until the metal fatigues and breaks. Alternatively, the member 115 can be detached by cutting or the like along the score line. The main panel 104 is then folded along the top hinge 107, along each of the side hinges 119a, 119b, and along the rear section hinge 112 (as depicted in FIGS. 5(a)–5(d)). As the main panel 104 is folded about the side hinges 119a, 119b the base section side tabs 113 are inserted into the lower slots 120 of the side sections 119. This attaches the base section 110 to the side sections 119. In a similar fashion, rear section tabs 114 are inserted into upper slots 121 of side sections 119 so as to attach the rear section 110 to the side sections. As illustrated in FIG. 5(g), after insertion, each of the inserted tabs 114, 113 are bent over their respective slots 120, 121 to secure the enclosure created by the folded main panel 104.

Figure 6A:
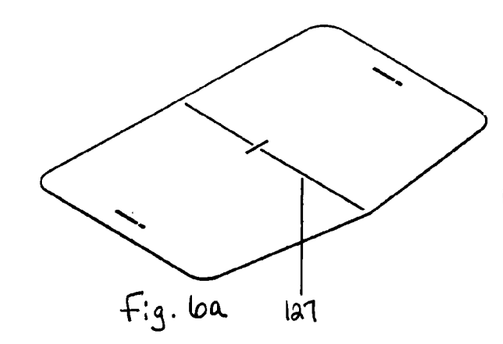
FIGS. 6(a)–6(f) are views illustrating a top panel assembly process for the second embodiment of the invention.
Figures 6B, 6C, 6F:
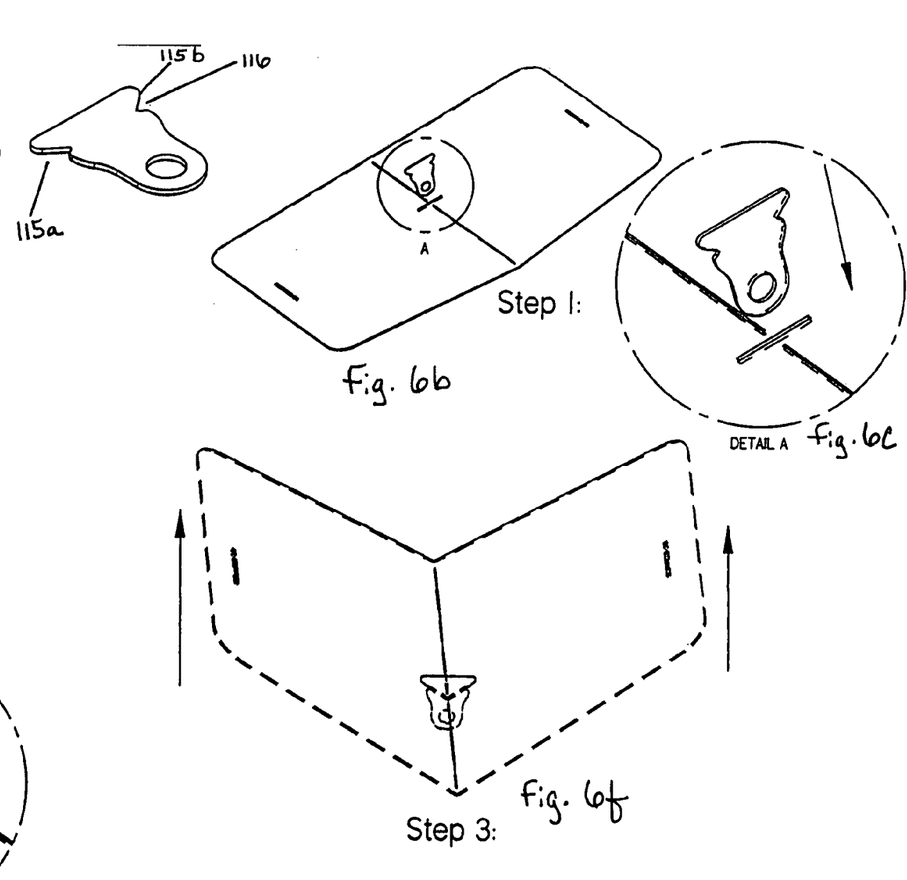
Figures 6D, 6E:
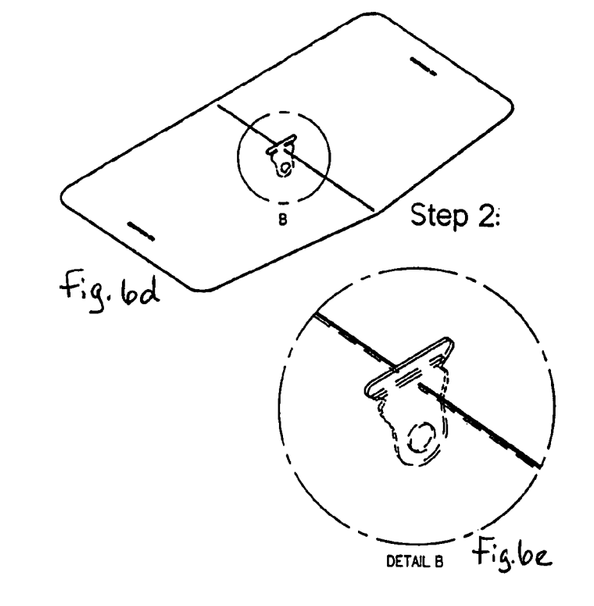

FIGS. 6(a)–6(f) are a view of the roof assembly process. FIGS. 6(b)–6(d) show how the now detached hanging member 115 is fully inserted into the central slot 131 of the detached top (roof) panel 126. Hanging member 115 has inclining edges 115a, 115b leading up to insertion grooves 116 on opposite sides of the member. The top panel 126 is then folded along seam 127 with respect to hanging member 115, after member 115 has been placed within slot 131. As such, the undersides of folded roof panel 126 will come into contact with the inclining edges 115a, 115b of the hanging member 115 to thereby define the pitch of the resulting roof (FIG. 6(f)). At the same time, the folded roof panel will engage within grooves 116 to lock the hanging member 115 in place. So equipped with hanging member 115, the completed birdhouse conveniently can be suspended from a structure, a tree or the like by string or cable secured to the hanging tab.

Figure 7A:
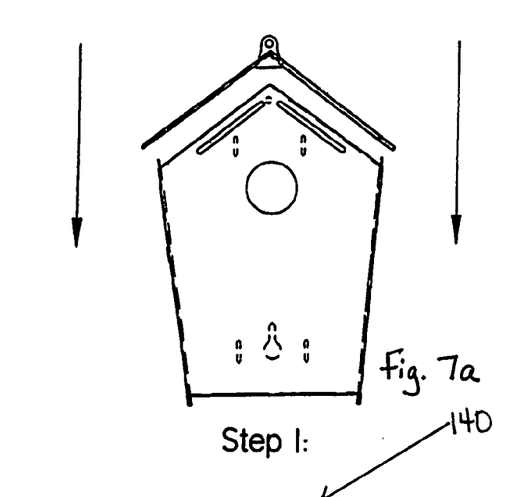
FIGS. 7(a)–7(f) are views illustrating attachment of the top panel in the second embodiment of the invention.
Figures 7B, 7E:
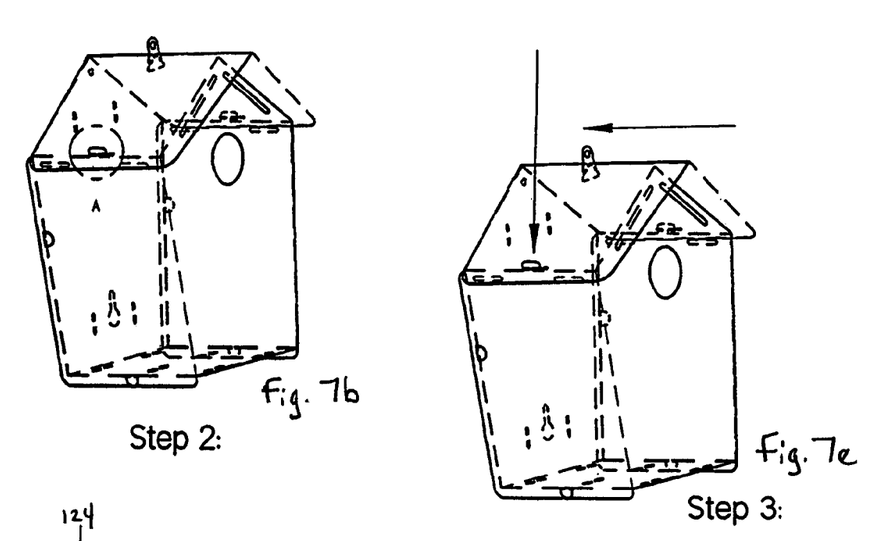
Figures 7C, 7F:
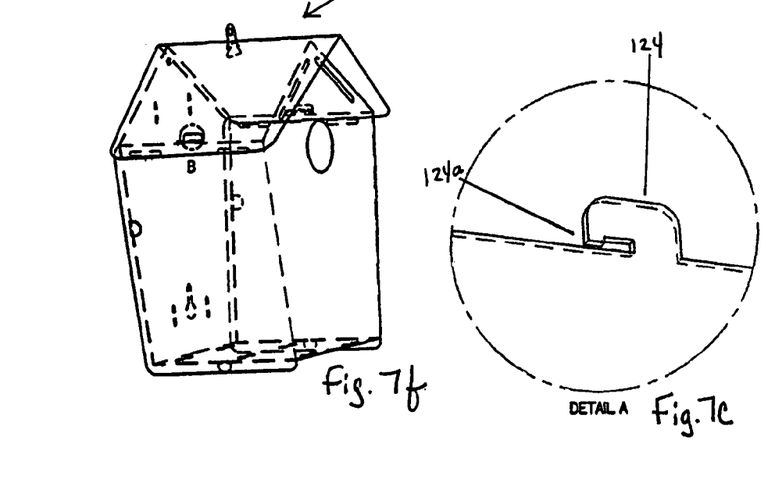
Figure 7D:
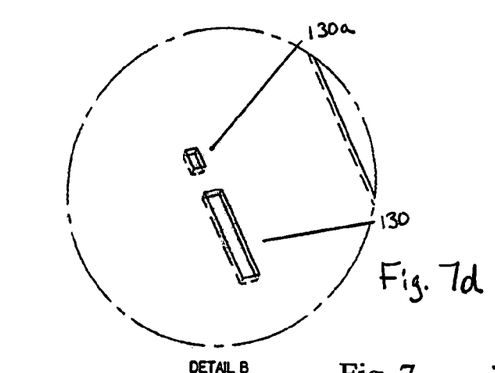

FIGS. 7(a)–7(f) depict roof attachment. As seen from FIG. 7(a), the folded roof panel 126 is attached to the folded main panel 104 by inserting the upper locking tabs 124 of the side sections 118a, 118b of the main panel 104 into the side slots 130 thereof. Once inserted, the now attached top panel 126 is made to slide as shown in FIG. 7(e) with respect to L-shaped upper tabs 124. After sliding the L-shaped tab 124 along the slot 130, the hook portion 124a is then inserted into the side slot extension 130a to thereby lock the folded top panel onto the folded main panel 104 (FIGS. 7(c)–7(d)). This secures the birdhouse 140 in assembled condition as shown in FIG. 7(f).

Figure 8:
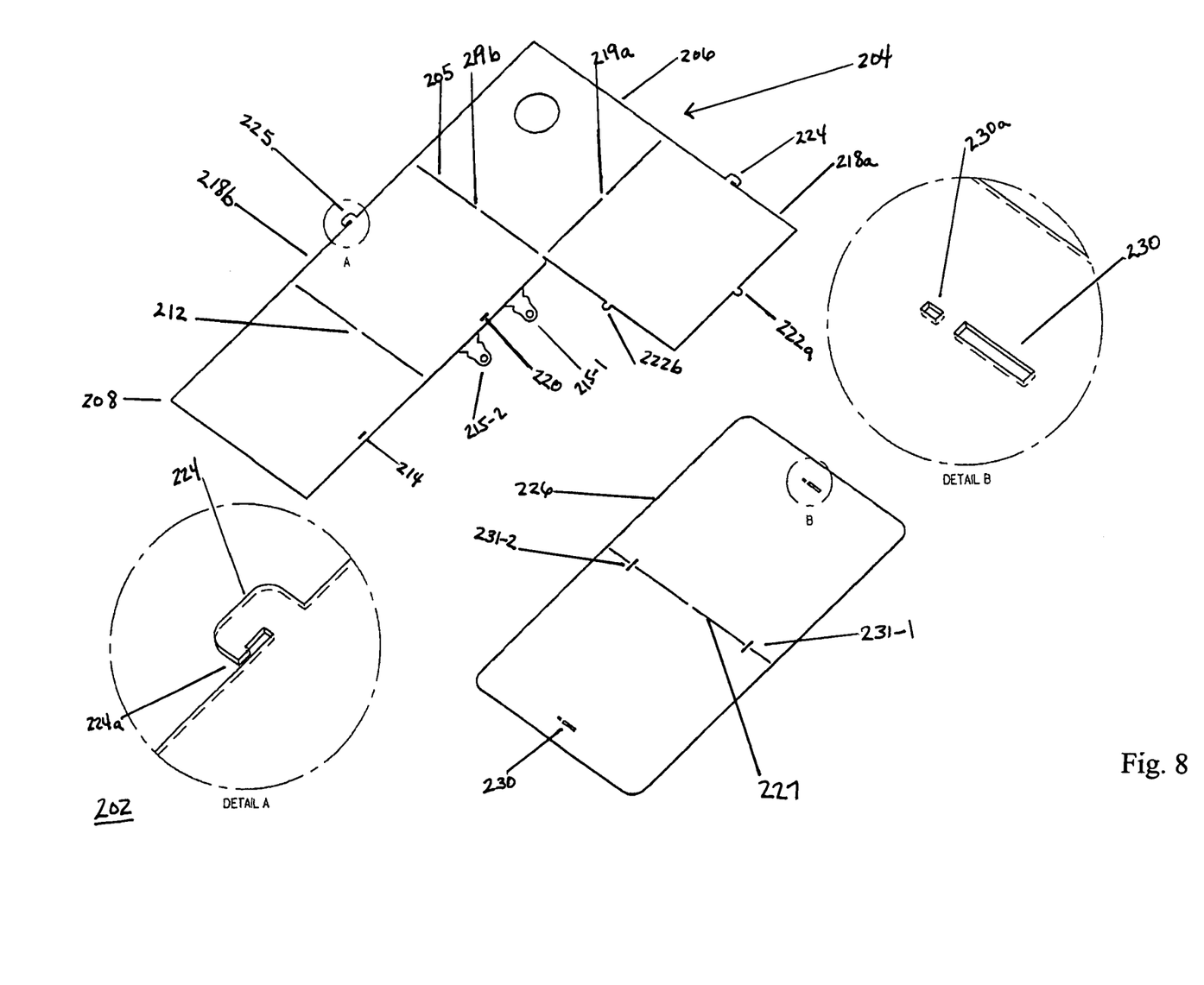
FIGS. 8 is a perspective view of the blank components of a third embodiment of the birdhouse in accordance with the present invention.

FIG. 8 is a view of a third preferred embodiment of production blank components 202 in accordance with the invention. This embodiment again includes a one-piece main panel 204 and a detached top or roof panel 226. Main panel 204 has precut seams 205 that define a rear section 208, a front section 206, and at least one side section 218. Rear section 208 has at least one rear section slot 214 formed at one side edge. Attached to the front panel 206 are first and second side sections 218a, 218b. First and second side sections 218a, 218b have first and second respective hinges 219a, 219b for folding relative to the front panel section 206 and at least one detachable hanging member 215 (two shown in this embodiment, 215-1 and 215-2) on an upper portion of the side edge. The first side section 218a further includes at least one u-shaped tab 222a, 222b on each side edge and at least one L-shaped locking tab 224 on the upper edge. Second side section 218b includes one L-shaped locking tab 225 on its upper edge, and at least one lower slot 220 on its lower edge. The L-shaped locking tabs 224, 225 likewise include a protrusion from the upper end of the L that creates a hook portion 224a, 225a. The lower slot 220 is disposed to receive the side section side tab 222b. Rear section 208 side slot 214 is disposed to receive side section tab 222a. The rear section 208 further includes a rear section hinge 212 so as to render the rear section 208 foldable relative to the second side section 218b. This embodiment likewise further includes detached top panel 226 with at least one connective side slot 230 formed on each opposing side edge thereof. Next to each connective side slot 230 is a side slot extension 230a. Slots 230 are disposed to receive the L-shaped locking tabs 224, 225 formed on the side sections 218 of the main panel 204 and the side slot extensions 230a are disposed to receive the hook portions 224a, 225a of the L-shaped locking tabs 224, 225. Top panel 226 also includes central slots 231-1, 231-2 that respectively receive dual hanging members 215-1, 215-2.

Figures 9A, 9B, 9C, 9D:
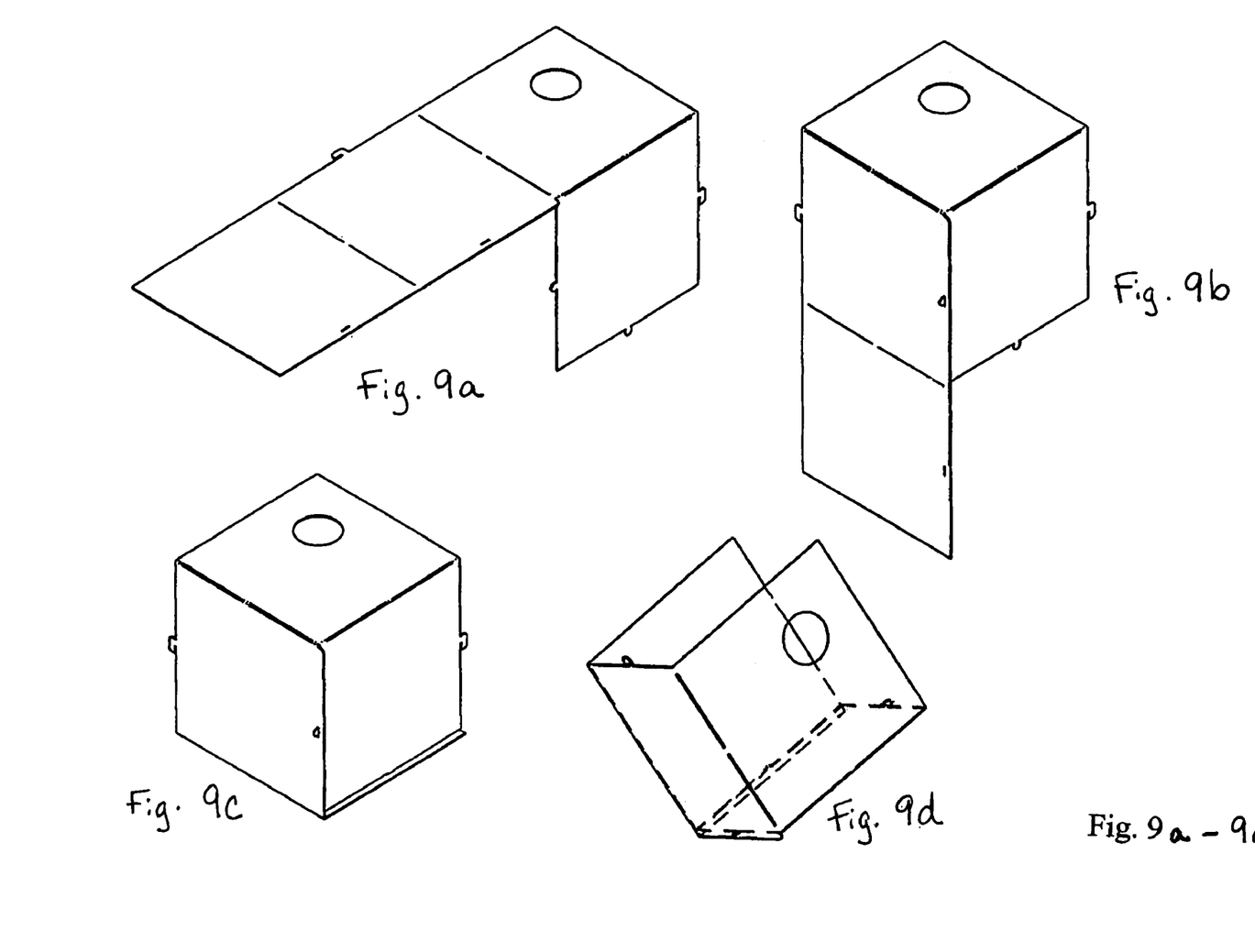
FIGS. 9(a)–9(d) are perspective views illustrating a folding process and securing process according to the invention to assemble the main enclosure structure of the third embodiment.

FIGS. 9(*a*)–9(*d*) demonstrate folding to assemble the enclosure of the third embodiment the inventive birdhouse. The initial steps in the folding process involve manually detaching the detachable hanging members 215-1, 215-2 from the rear section 208 in any manner as described previously. Main panel component 204 is then folded along each of the side hinges 219*a*, 219*b* (FIG. 9(*a*)–FIG. 9(*b*). As shown in FIG. 9(*c*), as the main panel 204 is folded about the side hinges 219*a*, 219*b*, the side section side tabs 222*a*, 222*b* are inserted into the lower slots 214 and 220. After insertion, each of the inserted tabs 222*a*, 222*b* likewise is bent over its respective slot 214, 220 to secure the body enclosure by the folded main panel 204 (FIG. 9(*d*)).

Figures 10A, 10B, 10C, 10D:
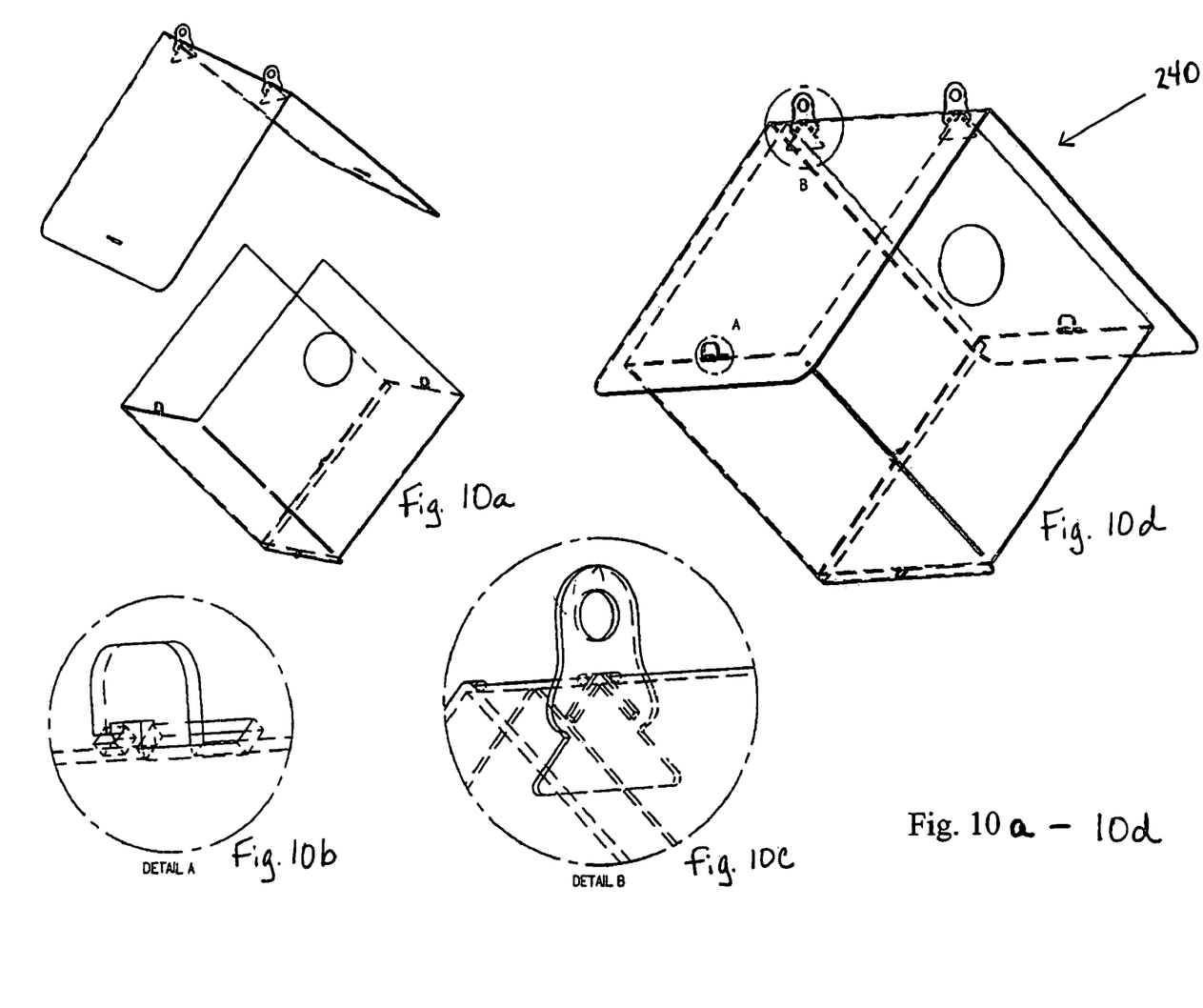
FIGS. 10(a)–10(d) are views illustrating attachment of the top panel for the third embodiment of the present invention.

FIGS. 10(*a*)–10(*d*) are views depicting the roof assembly process for the third embodiment. The now detached hanging members 215-1, 215-2 are fully inserted into central slots 231-1, 231-2 of top panel 226 to ensure locking of the hanging members 215-1, 215-2 within their insertion grooves 216*a*, 216*b* (FIGS. 10(*a*) and 10(*c*)). Top or roof panel 226 is then folded over hanging members 215-1 and 215-2 along the fold seam 227 until the undersides of folded roof panel 226 likewise contact the inclining edges 215*a*, 215*b* of each of member 215-1 and 215-2 to define the pitch of the resulting roof. FIG. 10(*a*) and FIG. 10(*d*) show how the folded top panel 226 is connected to folded main panel 204 by inserting the upper locking tabs 224, 225 of side sections 218*a*, 218*b* into side slots 230 of the top panel. Once inserted, the now attached top panel 226 slides with respect to the L-shaped upper locking tabs 224, 225. After sliding the L-shaped tabs 224, 225 along the slots 230, the hook portions 224*a*, 225*a* are then inserted into the side slot extensions 230*a*, 230*b* to thereby lock the folded top panel onto the folded main panel 204 (FIGS. 10(*b*)–10(*c*)). This secures the complete birdhouse 240 in assembled condition as shown in FIG. 10(*d*).

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, it should be noted by those skilled in the art that the disclosures are exemplary only and that various other alternatives, adaptations, and modifications may be made within the scope of the present invention. Accordingly, the present invention is not limited to the specific embodiments as illustrated herein, but is only limited by the following claims.

We claim:

1. A birdhouse comprising:
    a one-piece multi-sectional, manually foldable blank component folded to form an enclosure; and
    a single detachable panel component attached to the folded blank to cover the enclosure and provide a front of the birdhouse;
    wherein the one-piece foldable blank has plural sections foldably attached to each other by seams, the sections including a first section with first connective means and other sections with second connective means for engaging the first connective means to secure the plural sections together, at least one of the plural sections also including third connective means, and
    wherein the detachable panel component includes fourth connective means for engaging with the third connective means to mount the detachable panel component to the at least one of the plural sections.

2. A birdhouse as claimed in claim 1, wherein the one-piece blank component and the detachable panel component each are substantially metal.

3. A birdhouse as claimed in claim 2, wherein seams include at least one hinge defined by cuts into the metal to remove portions of the metal according to the lost material method.

4. A birdhouse as claimed in claim 1, wherein at least one of the first connective means and the second connective means includes manually bendable tabs and the other of the first and second connective means includes slots for receiving the tabs.

5. A birdhouse as claimed in claim 4, wherein the third connective means includes locking tabs and the fourth connective means includes slots for receiving the locking tabs.

6. A birdhouse comprising:
    a one-piece multi-sectional, manually foldable blank component folded to form an enclosure; and
    a detachable panel component attached to the folded blank to cover the enclosure;
    wherein the one-piece foldable blank has plural sections foldably attached to each other by seams, the sections including a first section with first connective means and other sections with second connective means for engaging the first connective means to secure the plural sections together, at least one of the plural sections also including third connective means, and
    wherein the detachable panel component includes fourth connective means for engaging with the third connective means to mount the detachable panel means to the at least one of the plural sections,
    wherein one of the plural sections or the detachable panel component includes a detachable hanging member, wherein the hanging member is separable from the one plural section or the detached panel component by repeated bending,
    wherein another one of the plural sections or the detached panel component has a slot for receiving the separated hanging member, and
    wherein the hanging member has inclined edges and a insertion groove defined, in part, by the inclined edges.

7. A birdhouse as claimed in claim 6, wherein the detachable panel component provides the roof of the birdhouse, wherein the slot for receiving the hanging member is in the roof, wherein the roof engages within the insertion groove, and wherein the inclined edges of the hanging member define a pitch of the roof.

8. A birdhouse as claimed in claim 7, wherein the detachable panel component locks onto the birdhouse by a fifth connective means that engages a protrusion on the locking tab with an extension of the respective slot.

9. A kit for manually constructing a birdhouse, said kit comprising:
    a one-piece blank component; and
    a single detached panel component for the blank,
    wherein the blank includes plural sections interconnected by seams permitting the sections to fold with respect to each other to form an enclosure, the sections including a first section having a first connective means and other section having second connective means for engaging the first connective means when the plural sections are folded, at least one of the plural sections also having third connective means, and wherein the detached panel component has fourth connective means for engaging with the third connective means to mount the detached panel component to the at least one of the plural sections and to cover the enclosure so as to provide a front of the birdhouse while providing an aperture for bird entry into the enclosure.

10. A kit as claimed in claim 9, wherein the one-piece blank component and the detached panel component each are substantially metal.

11. A kit as claimed in claim 10, wherein the seams include at least one hinge defined by cuts into the metal to remove portions of the metal according to the lost material method.

12. A kit as claimed in claim 9, wherein at least one of the first connective means and the second connective means includes manually bendable tabs and the other of the first and second connective means includes slots for receiving the tabs.

13. A kit as claimed in claim 12, wherein the third connective means includes locking tabs and the fourth connective means includes slots for receiving the locking tabs.

14. A kit for manually constructing a birdhouse, said kit comprising:
   a one-piece blank component; and
   a detached panel component for the blank,
   wherein the blank includes plural sections interconnected by seams permitting the sections to fold with respect to each other, the sections including a first section having a first connective means and other sections having second connective means for engaging the first connective means when the plural sections are folded, at least one of the plural sections also having third connective means, and
   wherein the detached panel component has fourth connective means for engaging with the third connective means to mount the detached panel component to the at least one of the plural sections,
   wherein one of the plural sections or the detached panel component includes a detachable hanging member,
   wherein the hanging member is separable from the plural sections or the detached panel component by repeated bending,
   wherein another one of the plural sections or the detached panel component has a slot for receiving the separated hanging member, and
   wherein the hanging member has inclined edges and an insertion groove defined, in part, by the inclined edges.

15. A kit as claimed in claim 14, wherein the detached panel component provides the roof of the birdhouse, wherein the slot for receiving the hanging member is in the roof, wherein the roof engages within the insertion groove, and wherein the inclined edges of the hanging member define a pitch of the roof.

* * * * *